(12) United States Patent
Sinkoff

(10) Patent No.: US 7,546,987 B2
(45) Date of Patent: Jun. 16, 2009

(54) CABLE TRAY ASSEMBLIES

(76) Inventor: Howard Sinkoff, 2741 NE. 4$^{th}$ Ave., Pompano Beach, FL (US) 33026

( * ) Notice: Subject to any disclaimer, the term of this patent is extended or adjusted under 35 U.S.C. 154(b) by 915 days.

(21) Appl. No.: 10/644,280

(22) Filed: Aug. 20, 2003

(65) Prior Publication Data

US 2005/0040295 A1  Feb. 24, 2005

(51) Int. Cl.
*F16L 3/22* (2006.01)
(52) U.S. Cl. .................... 248/68.1; 248/73; 403/169
(58) Field of Classification Search .................. 248/49, 248/68.1, 52, 58, 65; 24/369, 370; 403/169–178, 403/294, 306, 327, 329, 397; 52/167.1
See application file for complete search history.

(56) References Cited

U.S. PATENT DOCUMENTS

| | | | |
|---|---|---|---|
| 2,823,056 A * | 2/1958 | Di Meo et al. ............. | 403/376 |
| 2,891,750 A | 6/1959 | Bergquist | |
| 3,042,351 A * | 7/1962 | Du Bois ...................... | 248/49 |
| 3,618,882 A | 11/1971 | Podedworny | |
| 4,232,845 A * | 11/1980 | Turner ......................... | 248/49 |
| 4,236,688 A * | 12/1980 | Wilk ........................... | 248/71 |
| 4,417,711 A * | 11/1983 | Madej ........................ | 248/74.4 |
| 4,432,519 A | 2/1984 | Wright | |
| 4,505,621 A * | 3/1985 | Hilfiker et al. ............. | 405/284 |
| 4,774,105 A | 9/1988 | Takazawa et al. | |
| 5,199,756 A * | 4/1993 | Bartlett et al. ............. | 294/16 |
| 5,384,937 A * | 1/1995 | Simon ........................ | 24/295 |
| 5,465,929 A | 11/1995 | Dooley | |
| 5,628,481 A | 5/1997 | Rinderer | |
| 5,782,439 A | 7/1998 | Rinderer | |
| 6,061,884 A * | 5/2000 | Ohms et al. ................ | 24/703.1 |
| 6,068,220 A | 5/2000 | Alrey | |
| 6,247,871 B1 * | 6/2001 | Nickel et al. ............... | 403/396 |
| 6,313,405 B1 | 11/2001 | Rinderer | |
| 6,340,141 B1 | 1/2002 | Rinderer | |
| 6,354,542 B1 | 3/2002 | Meyer et al. | |
| 6,402,418 B1 | 6/2002 | Duran et al. | |
| 6,406,212 B1 | 6/2002 | Meyer | |
| 6,460,812 B1 * | 10/2002 | Jette ........................... | 248/49 |

(Continued)

FOREIGN PATENT DOCUMENTS

FR  2706973  12/1994

(Continued)

*Primary Examiner*—Steven Marsh
(74) *Attorney, Agent, or Firm*—Daniel C. Crilly; Kevin P. Crosby; Brinkley, Morgan et al.

(57) ABSTRACT

A cable tray is provided for supporting conductive cable and a system is provided to connect cable trays to create secure cable pathways to safely organize and support conductive cable. The system includes improved junctions for joinder of cable trays in any desired pre-formed shape that eliminates exposed sharp edges and allows for fast, easy installation. Various shaped connectors between adjacent cable trays provide secure, easy-to-install connections and maintain electrical conductivity between adjacent trays. A system for surface treating the cable trays renders the trays electrically non-conductive at desired portions of each cable tray, while leaving exposed certain portions of each tray. Mask blanks that fit the connectors and selected portions of the cable tray are used to expose electrically conductive portions of the cable trays during the treatment of the cable trays. Rollers are provided to facilitate drawing cables over the tray.

26 Claims, 10 Drawing Sheets

U.S. PATENT DOCUMENTS 6,498,296 B2 * 12/2002 Benito-Navazo ........... 174/68.3
6,547,192 B2    4/2003 Rinderer
6,590,154 B1 *  7/2003 Badey et al. .................. 174/48
6,637,704 B2 * 10/2003 Jette ............................ 248/49

FOREIGN PATENT DOCUMENTS

JP           62253780      11/1987

* cited by examiner

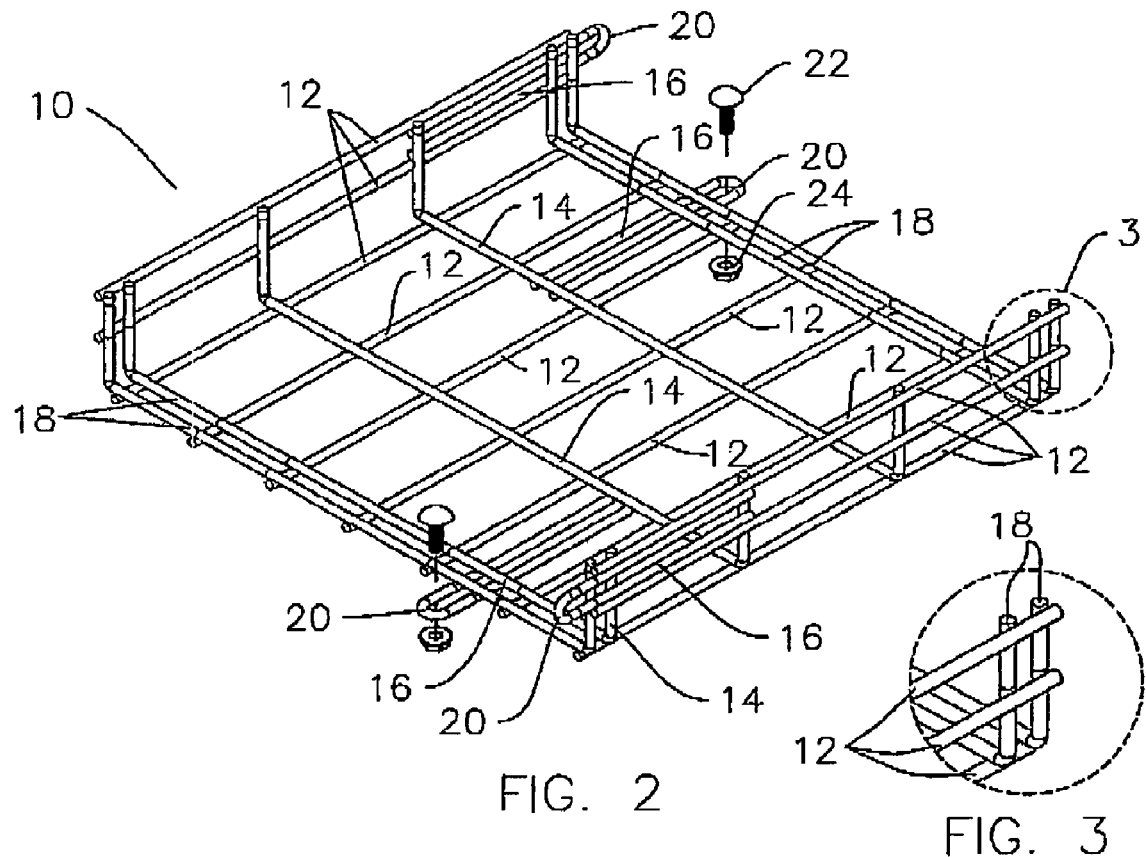
FIG. 2
FIG. 3
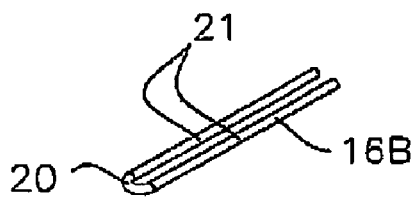
FIG. 4
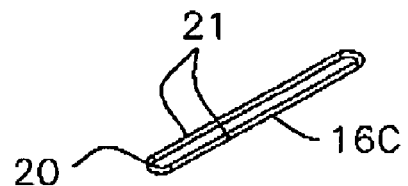
FIG. 5
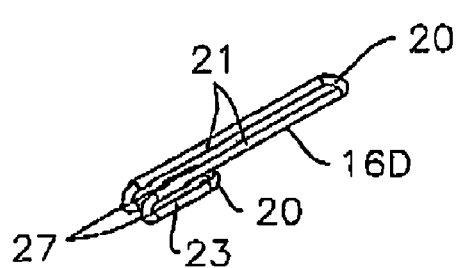
FIG. 6
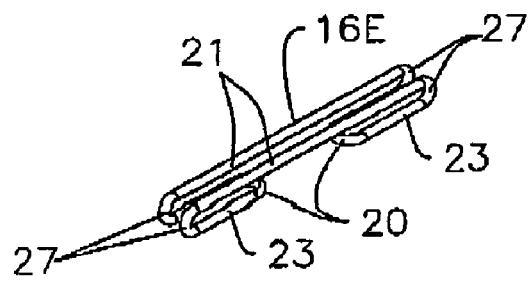
FIG. 7

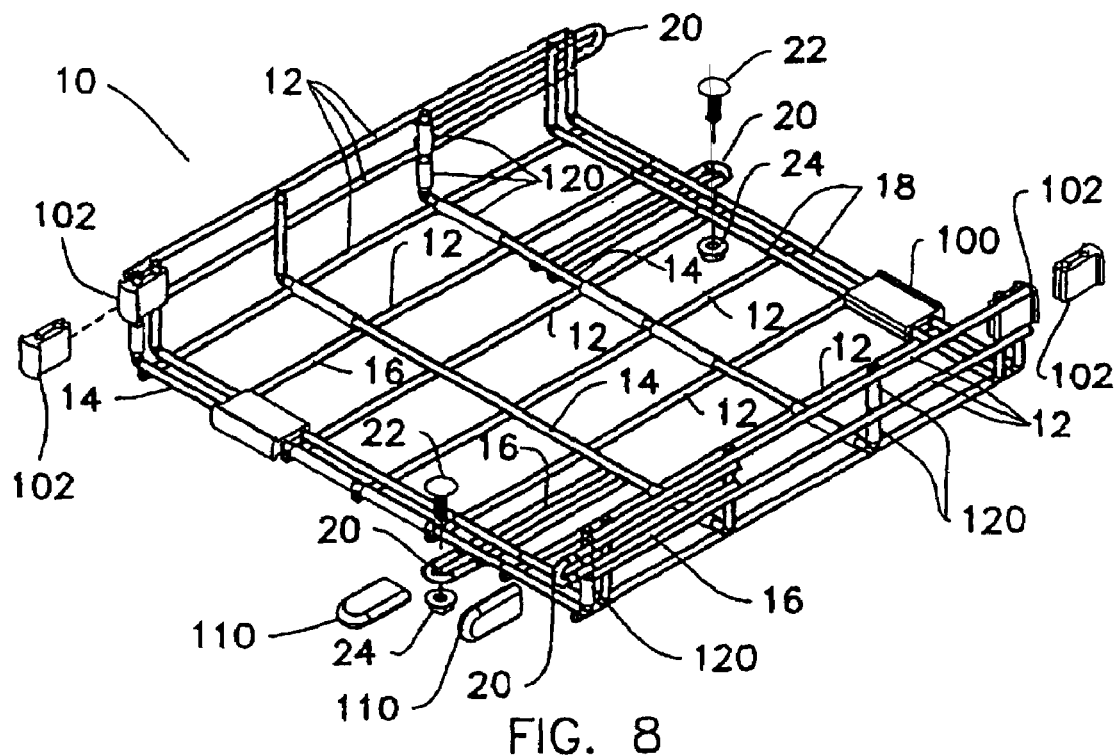
FIG. 8
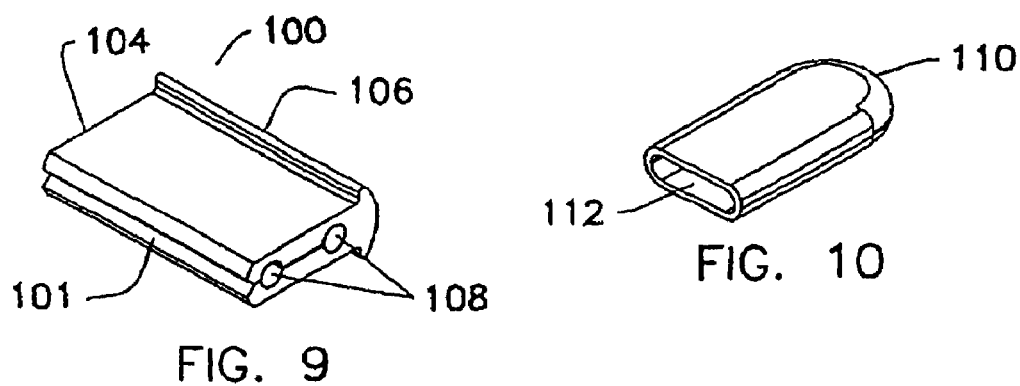
FIG. 9
FIG. 10
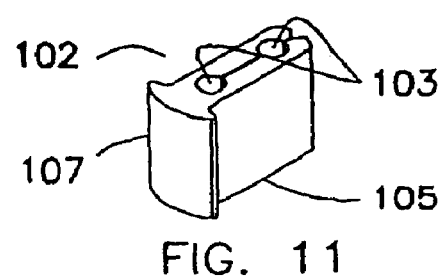
FIG. 11
FIG. 12

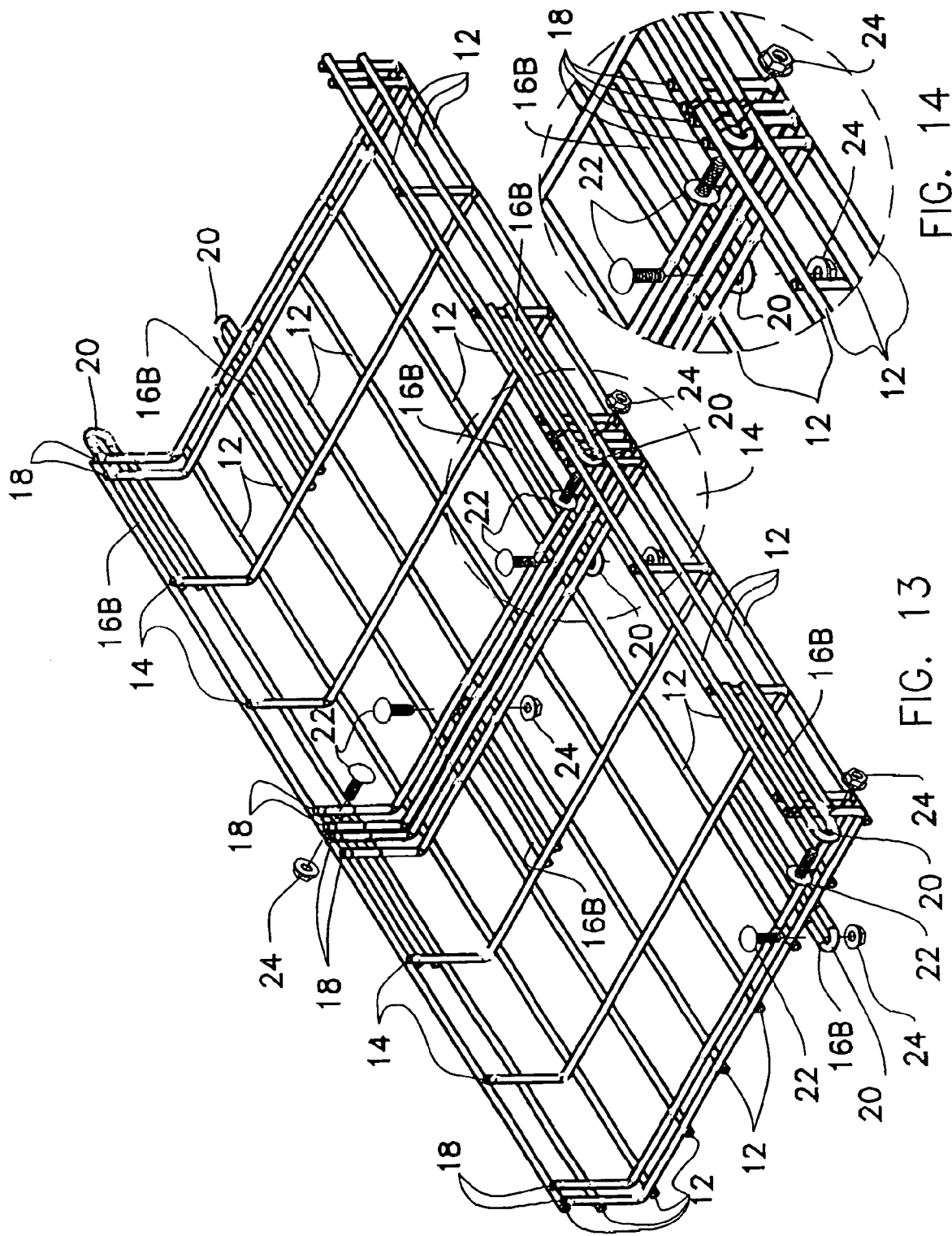

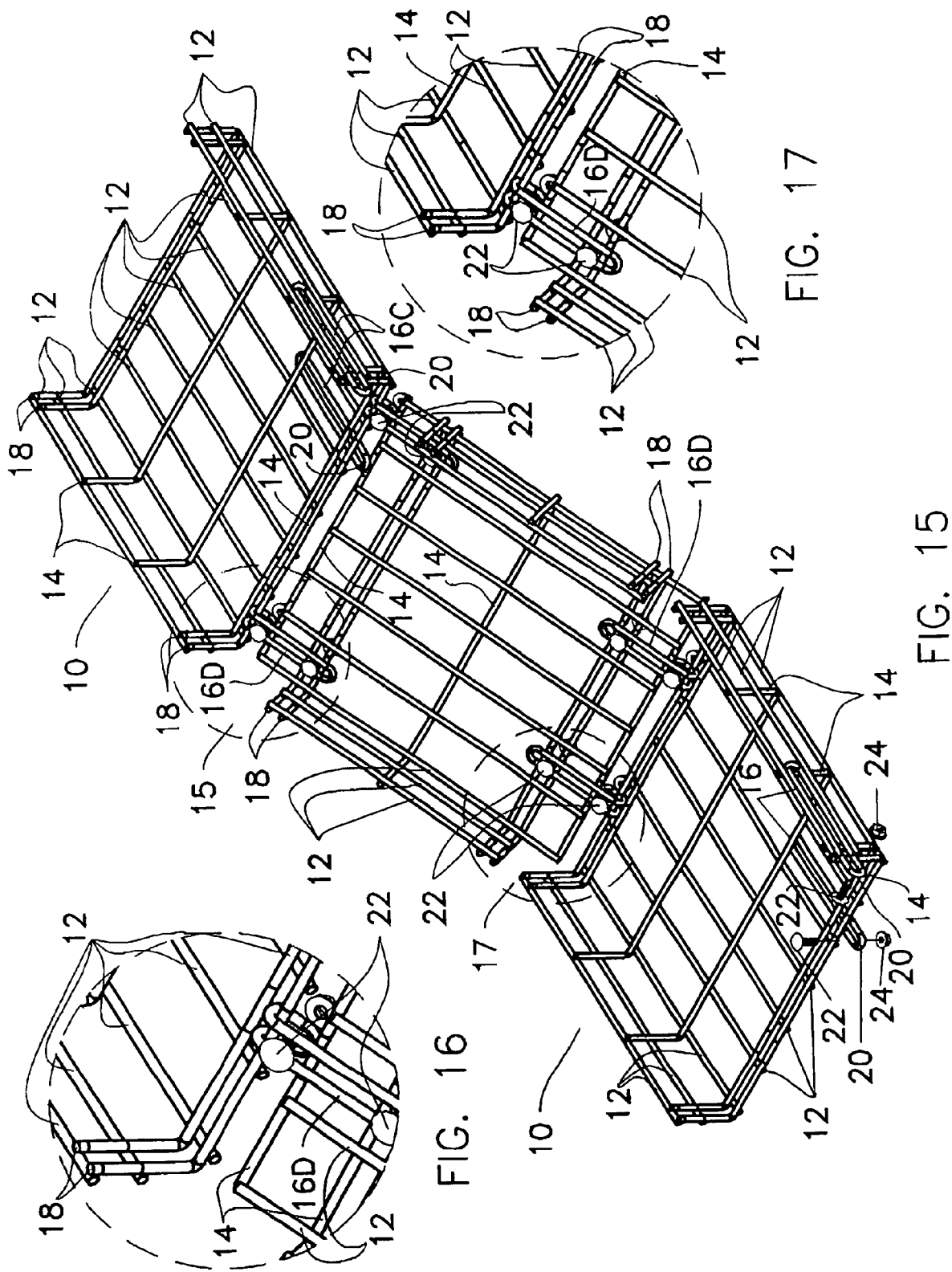

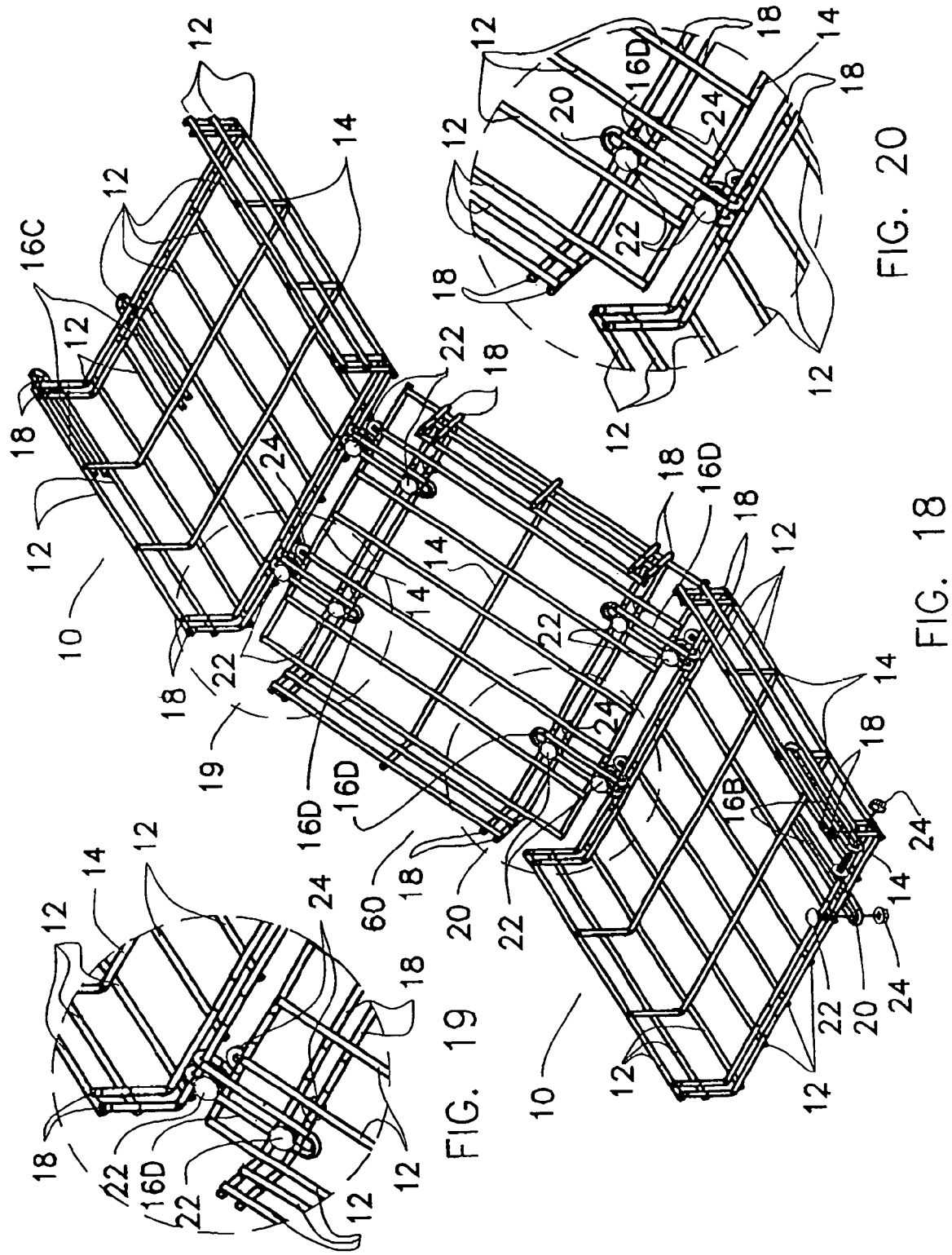

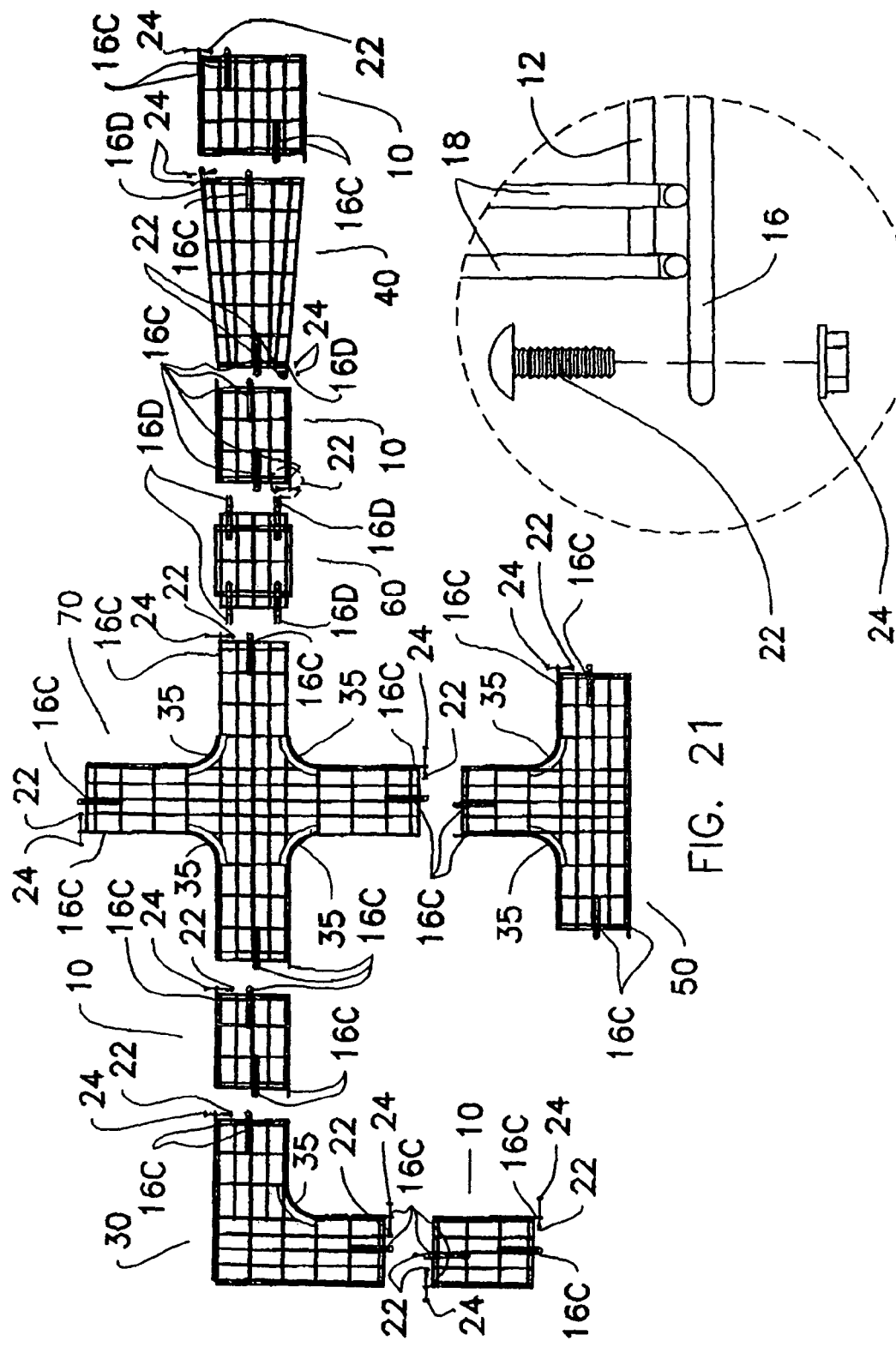

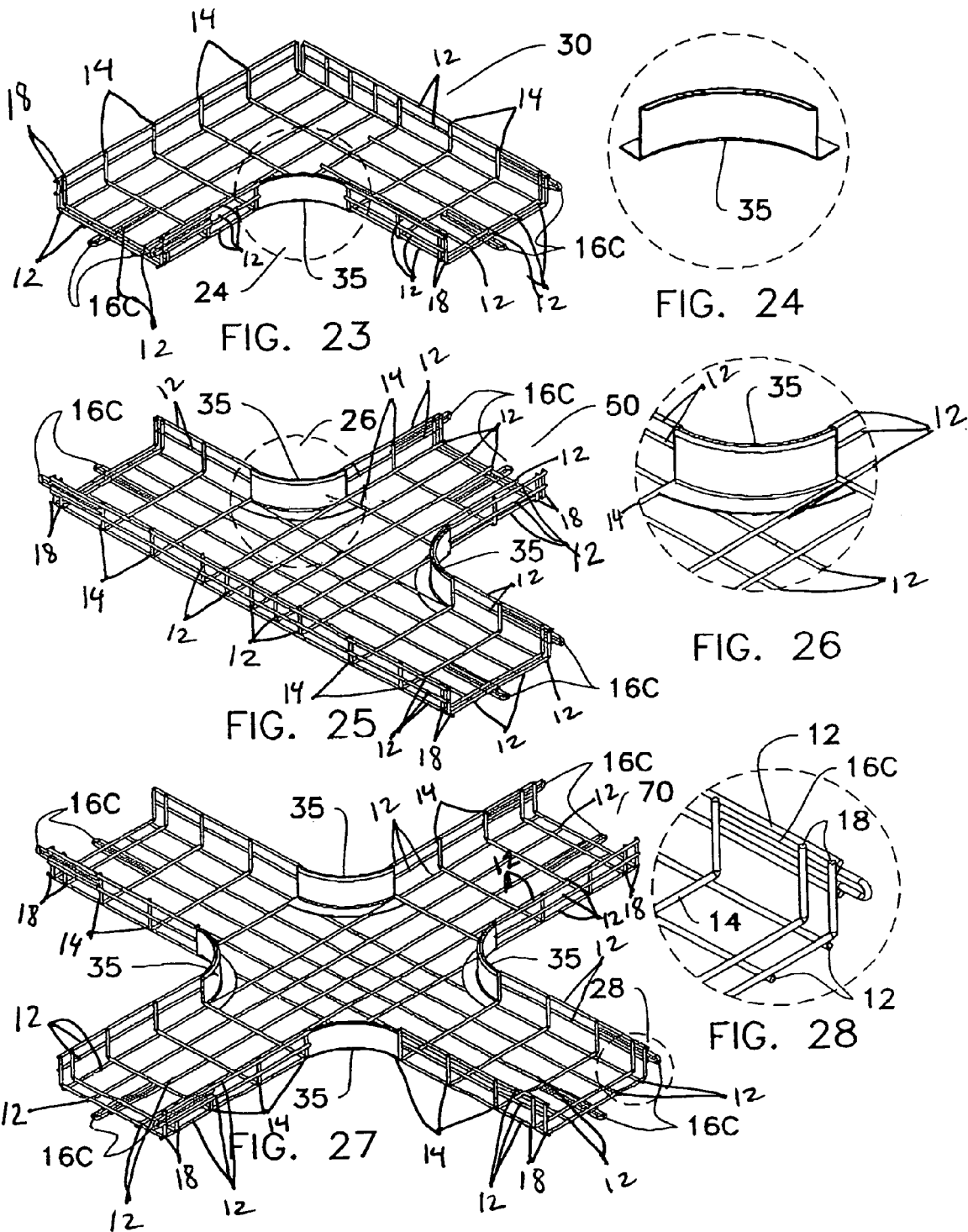

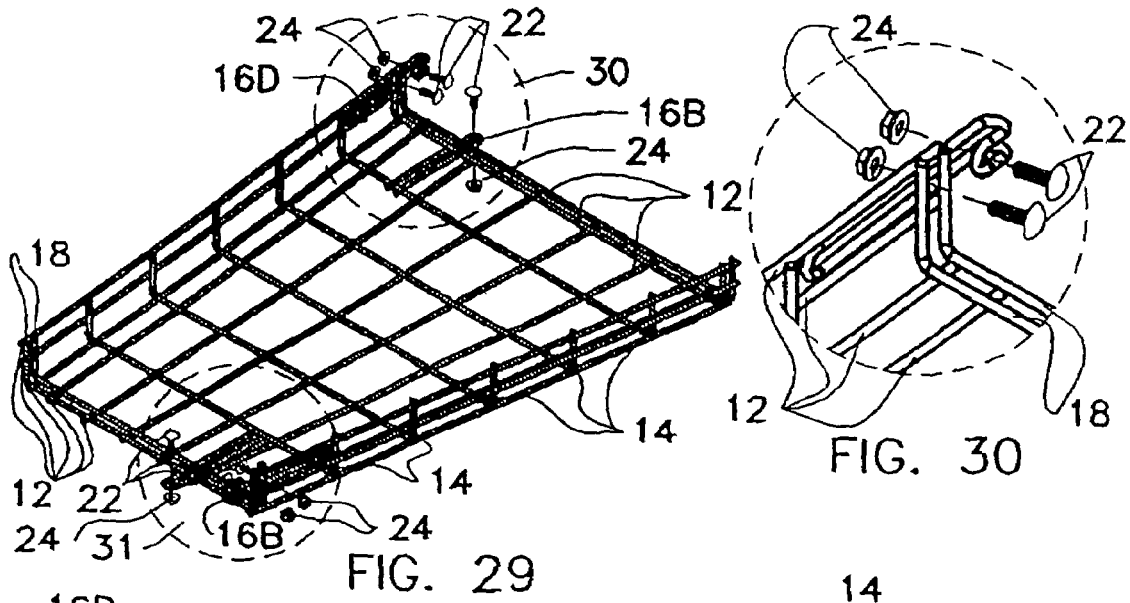
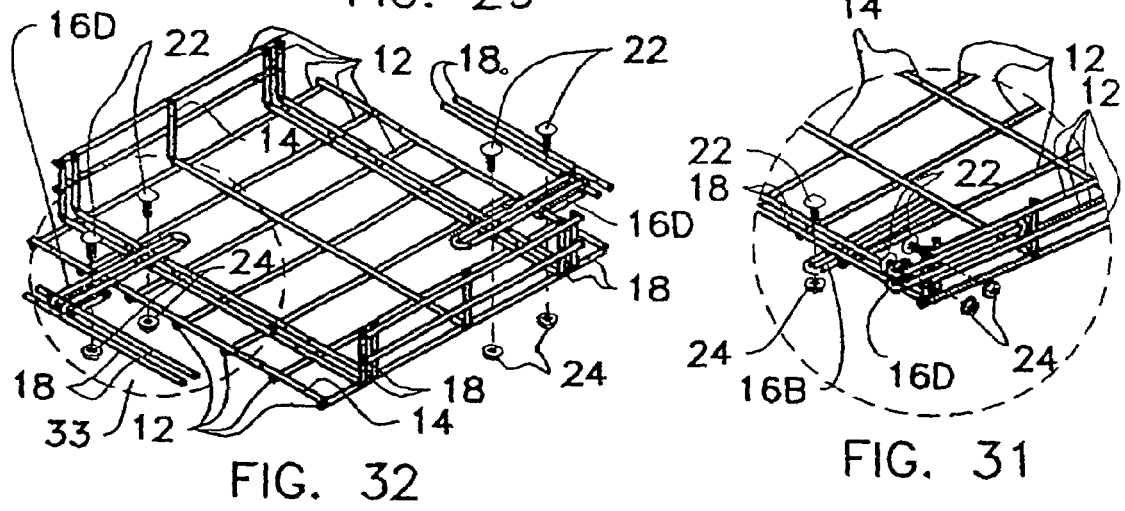
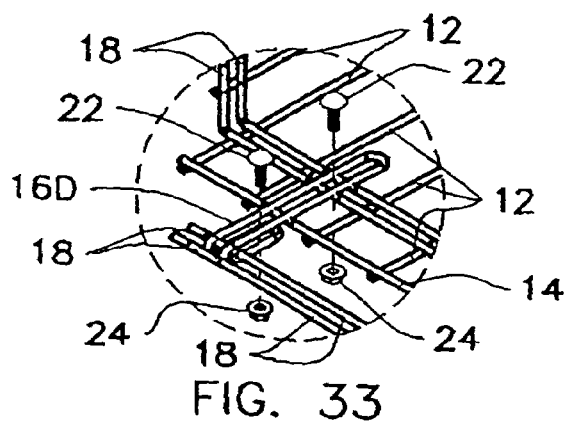
FIG. 29
FIG. 30
FIG. 31
FIG. 32
FIG. 33

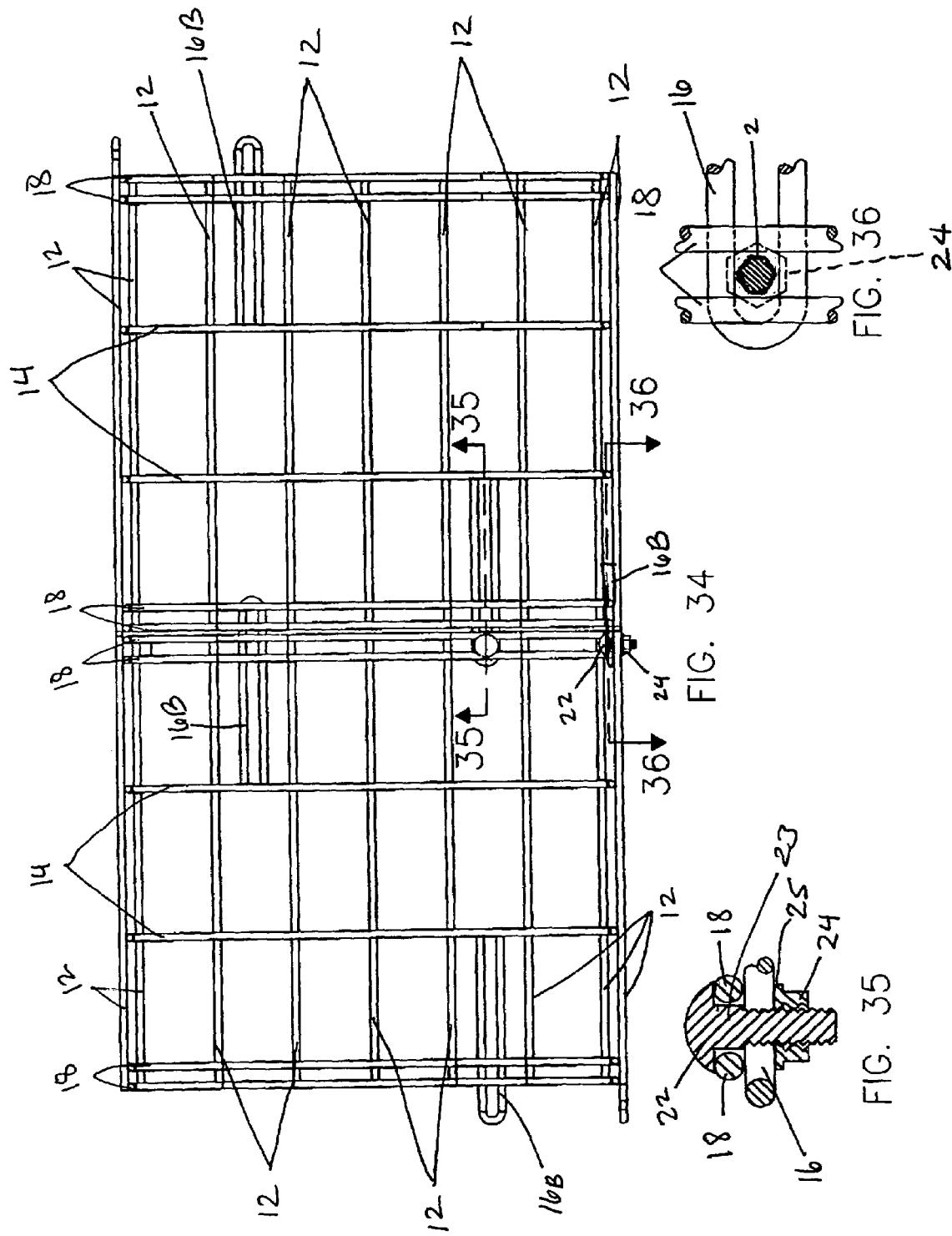

CABLE TRAY ASSEMBLIES

BACKGROUND OF THE INVENTION

1. Field of the Invention

This invention relates generally to apparatus and systems for supporting conductive cable, and, more particularly, relates to components of, and systems which utilize, cable trays to securely and safely organize and support conductive cable.

2. Background Art

Cable tray assemblies are well known for use as a support system for carrying conductive cable, wires, tubing, piping, or other conduits over various distances in buildings and other commercial structures. The cable tray assembly provides a support for running the wires throughout various locations in the facility. Cable trays are typically suspended from the ceiling or walls in order to provide a non-intrusive path for the cable that allows for full use of the work spaces below. Due to the amount of cable and conduit running through modern facilities, cable trays are also available which support cables at multiple elevations.

It has become common practice, and is presently required by the National Electric Code and most local building codes, to support conductive cable in commercial and industrial construction settings with support structures such as those referred to as "cable trays". Cable trays are typically made of wire lengths welded together in a cage-like arrangement to provide a support surface for the conductive cable. Cable tray sections have heretofore been made in only one shape: a straight, U-shaped channel. Cable tray sections have been connected together in end-to-end fashion and lengths of cable pulled thereover to facilitate connecting electrical and communications equipment in different places within a building. Since multiple cables may be positioned on any given section of cable tray, and since not all of these cables will have the same destination, it has become necessary to have intersecting runs of cable trays. Heretofore, the intersections of cable tray runs have been created manually on the job using wire cutters and brackets/clamps.

This arrangement is undesirable for a number of reasons. One reason is that leaving the actual connection of particular intersecting cable tray sections up to the discretion of the worker may lead to undesirable results such as insecure attachments and lack of electrical connectivity, which could yield disastrous repercussions since virtually all codes require that the cable trays be conductively connected for grounding purposes. Another reason is that the creation of such intersections by workers in the field is cumbersome, time consuming, and dangerous since wire cutters are used and sharp, exposed edges are present. Yet another undesirable aspect of the present procedure for manually joining intersecting cable tray sections is that, by cutting the wires which make up a particular cable tray segment, any corrosion resistant surface treatment on the cable trays is compromised, rendering efforts at corrosion resistance useless. Ideally, stainless steel or some other non-corrosive material is used to form the cable trays. However, since such materials are prohibitively expensive, the accepted practice is to utilize non-corrosion resistant materials and coat the trays with a corrosion resistant material.

Junction connectors of the prior art are disclosed in U.S. Pat. Nos. 5,628,481 and 5,782,439. However, such connectors have several disadvantages. These prior art designs include a plate having mounting holes extending therethrough about the edge of the plate. A connector that attaches a rail to the plate is secured to the plate by a vertically aligned fastener. While such an arrangement provides flexibility in accommodating rails approaching a junction at different angles, the fastener becomes a pivot point about which the rail can rotate about the plate. This is especially true if the fastening element is not properly tightened or if it becomes loose over time. Therefore, such designs do not adequately restrict rotation between the sections and the junction support. Such movement is undesirable since it becomes very difficult to keep the rails aligned through the junction.

Avoiding damage to a cable resulting from pulling the cable from one tray to another at an angle thereto (usually a right angle) and thus subjecting the cable to bending, has been a problem, particularly with regard to data transmission cable, since sharp bending of this type of cable often adversely affects its data transmission capability. Compounding the problem, cable tray systems involving different types of cable trays, different sizes of cable trays, and different arrangements of trays may be encountered.

All of the aforementioned problems, and others, result in a higher installation cost due to the unnecessary time spent on site cutting and clamping cable tray segments together, with the accompanying fatigue and occupational hazards. These problems also result in the potential for damage to the supported wires as they are drawn over the trays.

It is, therefore, highly desirable to find a solution to the aforementioned and other shortcomings.

SUMMARY OF THE INVENTION

The present invention provides an array of cable trays that conform to the National Electric Code's rigorous requirements of continuous grounding while providing aesthetically pleasing and highly functional cable tray components that are interconnected by a novel attachment system.

Among the several objects of the invention may be noted the provision of an improved junction for joinder of cable trays; the provision of such a junction which can be used as supplied and without requiring extras or taking special steps to enable pulling cable around from one tray run to another in a manner avoiding damage to the cable (e.g. in the case of data transmission cable, avoiding distortion of the quality of the data transmissability thereof); the provision of such a junction for joinder of cable trays in different configurations, particularly, but not by way of limitation, in L-formation, T-formation, or cruciform formation; and the provision of such a junction which is relatively economical to manufacture and convenient and economical to install.

Accordingly, the present invention is directed to a system, and accompanying apparatus, for connecting lengths of cable trays to create any desired configuration of supporting structure for runs of conductive cable, tubing, and the like.

In one aspect of the invention, cable tray sections are provided having an "L" shape, others are provided in a "T" shape, and others are provided in a cruciform shape. Further shapes may be provided, such as elbows (L-shaped sections) which do not form 90° angles, T-shaped sections a portion or all of which do not form a 90° angle, and cruciform shapes which have angles other than 90° included. Rounding the interior angles of these cable tray sections reduces the amount of bending of the cables that pass around each angle, and thus reduces distortion of the quality of data transmissions. Further, rounding the interior angles reduces the likelihood that a cable will become ensnared on a sharp exposed edge.

In another aspect of the invention, a system for connecting adjacent segments of cable trays is provided.

In yet another aspect of the invention, each cable tray section is powder coated or otherwise treated such that the treated portions of the cable tray are not electrically conductive. In contrast, the surfaces which come into contact with corresponding surfaces on adjacent cable tray sections are un-coated and treated with corrosion resistant material to render them electrically conductive, but protected from corrosion.

In yet a still further aspect of the invention, rollers are provided with some or all of the cable tray sections for facilitating the drawing of cables thereover.

BRIEF DESCRIPTION OF THE DRAWINGS

The specification uses the following figures to illuminate the preferred embodiments of the present invention. However, it is to be understood that the invention is not intended to be limited to the embodiments shown, which are merely exemplary and not by way of limitation.

FIG. 2 is a perspective view of an embodiment of a novel cable tray of this invention.

FIG. 3 is an enlarged view of the area of detail sown in FIG. 2.

FIG. 4 is a perspective view of a U-shaped connector receiving element.

FIG. 5 is a perspective view of an alternative connector receiving element.

FIG. 6 is a perspective view of a further alternative connector receiving element.

FIG. 7 is perspective view of a still further alternative connector receiving element.

FIG. 8 is a perspective view of a cable tray with mask blanks and anti-friction rollers.

FIG. 9 is a perspective view of a wide transverse wire mask blank.

FIG. 10 is a perspective view of a connector receiving element mask blank.

FIG. 11 is a perspective view of a narrow transverse wire mask blank.

FIG. 12 is a perspective view of an anti-friction roller.

FIG. 13 is a perspective view of two interconnected cable trays.

FIG. 14 is a enlarged view of the connection between two interconnected cable trays.

FIG. 15 is a perspective view of the cable tray connecting system where a cable tray drop is employed to change elevations utilizing straight and the J-shaped hook connector receiving elements.

FIG. 16 is an enlarged view of the area of detail shown in FIG. 15.

FIG. 17 is another enlarged view of the area of detail shown in FIG. 15.

FIG. 18 is a perspective view of the cable tray connecting system where a cable tray drop is employed to change elevations where only J-shaped hook connector receiving elements are used.

FIG. 19 is an enlarged view of the area of detail shown in FIG. 18.

FIG. 20 is an enlarged view of the area of detail shown in FIG. 18.

FIG. 21 is an exploded top plan view of a portion of an exemplary cable tray arrangement in accordance with the invention.

FIG. 22 is an enlarged view of the area of detail shown in FIG. 21.

FIG. 23 is a perspective view of an L-shaped cable tray with a rounded corner.

FIG. 24 is an enlarged view of the area of detail shown in FIG. 23.

FIG. 25 is a perspective view of a T-shaped cable tray with rounded corners.

FIG. 26 is an enlarged view of the area of detail shown in FIG. 25.

FIG. 27 is a perspective view of cruciform-shaped cable tray with rounded corners.

FIG. 28 is an enlarged view of the area of detail shown in FIG. 27.

FIG. 29 is a perspective view of a reducer cable tray.

FIG. 30 is an enlarged, exploded view of the area of detail in FIG. 29.

FIG. 31 is an enlarged, exploded view of the area of detail in FIG. 29.

FIG. 32 is a perspective, expanded view of a cable tray and the connection to adjacent cable trays.

FIG. 33 is an enlarged, exploded view of the area of detail in FIG. 32.

FIG. 34 is a top plan view of two connected, adjacent cable trays.

FIG. 35 is a cross-sectional, elevational view along the cross-section line indicated in FIG. 34.

FIG. 36 is a cross-sectional, elevational view along the cross-section line indicated in FIG. 34.

DETAILED DESCRIPTION OF THE PREFERRED AND ALTERNATIVE EMBODIMENTS

Figure 1:
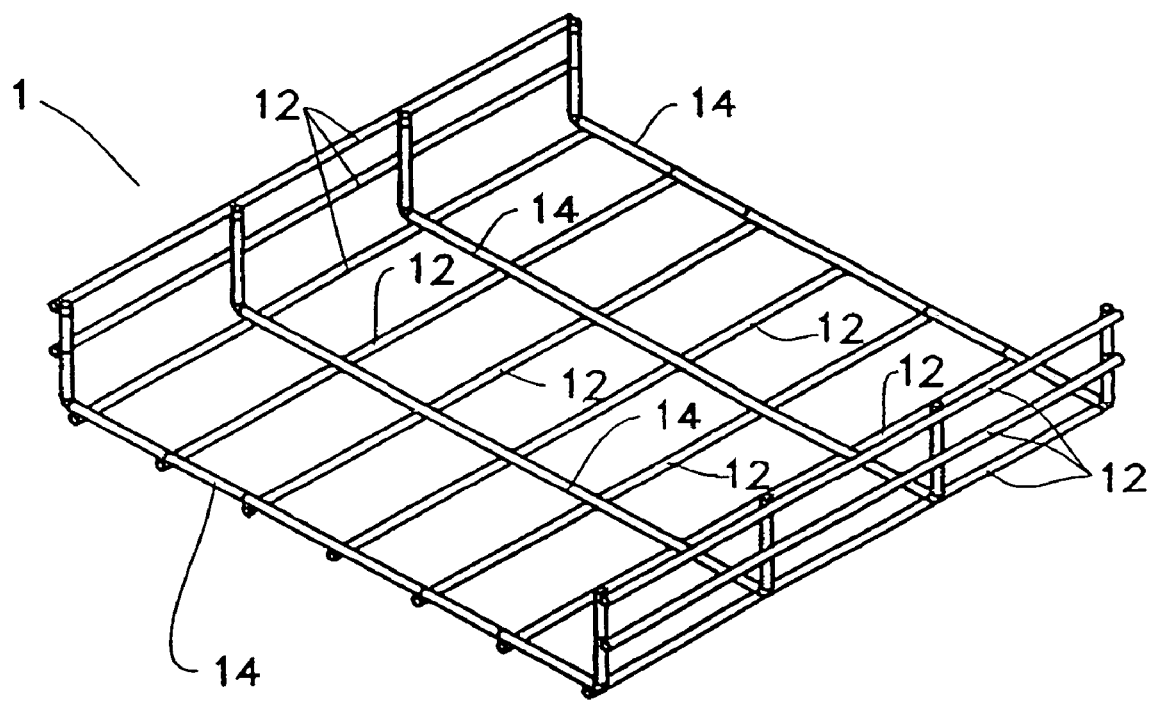
FIG. 1 is a perspective view of a prior art cable tray.

As shown in FIG. 1, prior art cable trays are comprised of longitudinal wires 12, also known as "warp" wires, that run longitudinally, and transverse wires 14, also called "weft" wires, running perpendicularly to the warp wires and welded or otherwise permanently connected thereto to form a U-shaped basket or tray. The sections 1 are of any suitable length, and adjacent sections (not shown) are connected to each other on-site by cutting off wire segments, if necessary, and clamping the cable tray sections together. As stated previously, requiring workers in the field to cut the cable tray sections and clamp them together is not only cumbersome, time-consuming and costly, but potentially dangerous.

As shown in FIGS. 2 and 13-14, the cable tray connecting system of the instant invention may utilize an otherwise standard cable tray 10, which can be comprised of longitudinal wires 12 interconnected with transverse wires 14. One improvement of the instant invention lies in the inclusion of connector receiving elements 16, which in the embodiment shown (which is not intended to limit the scope of the invention) are in the shapes shown in FIGS. 4-7. Connector receiving elements 16 are connected to transverse wires 14 as shown, and may be employed either on the upstanding sidewall portions and/or on the flat, weight-bearing portions, or both, of cable tray 10. Any number of connector receiving elements 16 may be employed. The two connector receiving elements 16 on each side of the cable tray 10 shown in FIGS. 2 and 8 are merely exemplary, it being understood that fewer or more than the numbers shown and positions other than those shown may be suitable for particular applications.

Another aspect of the invention shown in FIGS. 3, 13 and 14 lies in the employment of end transverse wires 18, which are parallel and fairly closely spaced together and which are adapted to overlap with connecting loops 20 of connector receiving elements 16 in such a way that loops 20 lie in registry with a corresponding portion of the space between transverse wires 18, thereby forming a space through which fasteners, such as carriage bolt 22 and nut 24, may be passed to interconnect adjacent cable tray sections. In the preferred embodiment, a carriage bolt 22 is used as the fastener due to its smooth upper surface and hexagonal bolt head below the upper smooth curved head, where the hexagonal bolt head is sized and shaped so as to snugly fit in the space between transverse wires 18 and connector receiving elements 16 to prevent bolt 22 from rotating when nut 24 is threaded thereon. In this way, an installer need only use a single tool to tighten nut 24 onto bolt 22. However, it is to be understood that any suitable fastener may be used to interconnect connector receiving element 16 with transverse wires 18.

There are four illustrated alternative embodiments of the loops 20 of connector receiving element 16 that provide both ease in connecting adjacent tray sections and security in the connection. Other embodiments within the scope of this invention will occur to those of skill in the art. In FIG. 4, connector receiving element 16B comprises an elongated U-shape with two generally parallel straight sections 21, connected on one end with a connecting loop 20. In FIG. 5, connector receiving element 16C comprises an elongated ellipse with two (2) approximately parallel straight sections 21 and two (2) connecting loops 20 that connect the ends of the parallel straight sections 21. In FIG. 6, connector receiving element 16D, in the shape of a single, J-shaped hook, comprises a narrow elongated ellipse with two (2) approximately parallel straight sections 21, connected on one end with a connecting loop 20. The opposing end of each straight section 21 consists of a curved section 27 that lies in a plane approximately perpendicular to straight sections 21 and connects to a straight section 23. Each straight section 23 is approximately parallel with each other and with each straight section 21. The two (2) straight sections 23 are connected by a connecting loop 20 that lies in a plane approximately parallel with straight sections 23. In FIG. 7, connector receiving element 16E, in the shape of a double, J-shaped hook, includes two (2) approximately parallel straight sections 21. Each end of each straight section 21 is connected to a curved section 27 that lies in a plane approximately perpendicular to straight sections 21. Each curved section 27 is connected to a straight section 23. The straight sections 23 are approximately parallel with each other and with the straight sections 21. The end of each straight section 23 opposite the curved section 27 is connected to a connecting loop 20 that lies in a plane approximately parallel with straight sections 23. Connector receiving elements 16D and 16E are designed to accommodate a portion of the transverse wires 18 between the straight sections 21 and straight sections 23. FIGS. 16, 17, 19, and 20 show close-ups of a use (but not the only use) of connector receiving element 16D in a cable tray assembly. It is understood that connector receiving element 16E can be used in similar and other manners. These connector receiving elements 16 may be attached to the exterior of the cable tray 10, which is the side of the cable tray 10 that faces away from the cables, in order to reduce the likelihood that a cable passed over the cable tray 10 will catch or snag on the connector receiving element 16.

As shown in FIGS. 15-20, one benefit to using connector receiving elements 16D or 16E is that they allow for easy and secure change in elevation of the cable tray 10. Instead of using straight connector receiving elements 16B or 16C, these alternative connector receiving elements 16D or 16E enclose the transverse wires 18 between the parallel straight sections 21, 23 of the connector receiving elements 16D, 16E. Use of a cable tray drop 60 further increases security of the change in elevation since each cable tray drop 60 has at least two connector receiving elements 16D or 16E on each end of its weight-bearing portion. In the embodiment shown in FIG. 15, the upper cable tray 10 has a connector receiving element 16C on the end of the cable tray facing the cable tray drop 60. In an alternative embodiment shown in FIG. 18, the upper cable tray 10 has a connector receiving element 16C on the edge of the cable tray 10 facing away from the cable tray drop 60. These embodiments allow for connection between additional cable trays as desired. The addition or removal of additional connector receiving elements 16, as understood by one of skill in the art, allows for accommodating the particular needs of the cable tray assembly. Cable tray drop 60 can swing relative to adjacent cable trays 10, 30, 50, 70, which permits varying changes in elevation, as may be required by a particular arrangement in the field, without a need to manufacture different cable tray drops 60 for different angles of elevation. The loop 20 of the connector receiving element 16 can be adapted so that, after tightening of the carriage bolt 22 and nut 24, the cable tray drop 60 is held generally immobile.

Examples of various shaped embodiments of cable trays consistent with the instant invention are shown in FIGS. 21, 23 and 25 at 30, 50, and 70. These correspond to "L", "T", and cruciform shaped trays, which permit for the interconnection of cable tray runs in divergent/convergent directions. In this way, workers are not required to cut cable tray sections and clamp them to others. Rather, these ready-made forms permit for the easy design and simple installation of a cable tray system of any pattern desired. Moreover, the specific cable tray components for a particular installation can be determined precisely and supplied in advance, as the exact number and shape of each cable tray can be specified by the architect or engineer. In this way, cable tray systems in accordance with this invention can be provided at the absolute minimum cost. It will be apparent to those of skill in the art that, regardless of the shape of the cable tray or the pattern of the cable tray system, the connecting system shown and described in connection with FIGS. 2, 13, and 15-17 may be employed. Moreover, it is to be appreciated that the shapes shown herein are exemplary, it being understood that the shape of any particular cable tray can be in any suitable configuration. As shown in FIGS. 21-25, the interior angle 35 of the shaped cable trays 30, 50, and 70 can be rounded to reduce the bending and/or chafing of cables that are passed around each interior angle 35 and therefore decrease the likelihood of a loss of transmission quality in the cable and also reduce the likelihood that a cable will catch on a sharp, exposed edge.

As illustrated in FIGS. 23, 25, and 27, the longitudinal wires 12 and transverse wires 14 become transposed due to the angles of the alternative shaped embodiments of cable trays 30, 50, and 70. For example, in FIG. 23, the transverse wires 14 extend across the width of cable tray 30 at the ends closest to the end transverse wires 18. However, these same transverse wires 14 become longitudinal wires 12 when the corner is turned. It is understood that this transposition only affects the labeling of the transverse wires 14 and longitudinal wires 12, not the characteristics of the wires 12, 14 or the cable tray 30.

A portion of an overall system of cable trays in accordance with the invention is shown in FIG. 27. As shown in FIGS. 27 and 29, a reducer cable tray 40 is used between two straight cable trays 10 with different widths to allow for a seamless connection in the cable tray layout. FIG. 28 shows a closeup view of a connector receiving element 16 attached to the sidewall of a cable tray assembly 10. It also shows an embodiment wherein the carriage bolt 22 is inserted through the connector receiving element 16 such that both the head and the shank of the carriage bolt 22 faces away from the cable supporting surface of the cable tray 10. This orientation of carriage bolt 22 and nut 24 reduces the likelihood that a cable that is passed over the cable tray 10 will catch on the nut 24, or thread shank of bolt 22, because the carriage bolt 24 has a smooth head.

FIG. 32 shows an embodiment of a cable tray 10 that uses two connector receiving elements 16D, one on each end of the cable tray. As shown in this figure, carriage bolts 22 are passed through connector receiving elements 16D, through a space defined by end transverse wires 18, and secured by a nut 24. End transverse wires 18 from adjacent cable trays are shown without the cable trays themselves for illustration purposes. FIG. 33 shows a closeup view of the use of the carriage bolts in the above-described manner.

The cable tray system may be modified by a surface treatment. A preferred method of surface treating the cable tray of the instant invention will now be described. In order to keep the cost of the cable tray components to a minimum, the longitudinal and transverse wires 12 and 14, respectively, are made of inexpensive material such as cold rolled, untreated wire. Obviously, it is within the scope of this invention to utilize stainless steel or other corrosion resistant materials, but they are prohibitively expensive. As a result, it is perfectly acceptable to use less expensive materials for these components, so long as they are painted, powder-coated, or otherwise covered or treated to render them electrically insulated and protected from corrosive contaminants. However, connector receiving elements 16 and transverse wires 18 must have electrically conductive exposed surfaces since they will make contact with corresponding wires or connector receiving elements, respectively, of adjacent cable trays, so as to render the entire cable tray system grounded. Therefore, it is desirable to provide connector receiving elements 16 and transverse wires 18 in the form of either corrosion resistant metal or corrodible material treated to render it non-corrosive, such as by galvanizing or zinc plating. Connector receiving elements 16 and transverse wires 18 are welded to the cable tray and a portion of the surface areas thereon, which are intended to be placed into intimate contact with adjacent cable trays, and are masked with connector receiving element mask blank 110, wide transverse wire mask blank 100, and/or narrow transverse wire mask blank, 102, respectively. The entire, masked, cable tray is painted, powder-coated, or otherwise treated to protect the entirety thereof, other than the masked areas, which have already been treated with galvanization, zinc plating, or other conductive, non-corrosive coating.

A suitable wide transverse wire mask blank 100 is shown in FIG. 9. Wide mask blank 100 may be provided in any suitable form. In the preferred embodiment shown, the blank is constructed of a body member 104 and head member 106. Body member 104 defines one or more cylindrical recesses 108 therein which are adapted to accommodate and cover portions of transverse wires 18 which must remain electrically conductive and, hence, exposed. The side of the body member 104 opposite the head member 106 defines a cut-out 101 that permits the wide mask blank 100 to be easily slipped over a designated transverse wire 18 or portion thereof. Wide transverse wire mask blanks 100 are placed upon the designated areas to be masked prior to powder-coating, painting, or other treatment and thereafter can be easily removed by grasping enlarged head end 106 and removing. Wide transverse wire mask blanks 100 may be reused as often as desired.

A suitable narrow transverse wire mask blank 102 is shown in FIG. 11. In the preferred embodiment shown, the blank is constructed of a body member 105 and head member 107. Body member 105 defines one or more cylindrical recesses 103 therein which are adapted to accommodate and cover portions of transverse wires 18 which must remain electrically conductive and, hence, exposed. The side of the body member 105 opposite the head member 107 defines a cut-out 109 to permit the mask blank 100 to be easily slipped over a designated transverse wire 18 or portion thereof. Narrow transverse wire mask blanks 100 are placed upon the designated areas to be masked prior to powder-coating, painting, or other treatment and thereafter can be easily removed by grasping enlarged head end 107 and removing. Narrow transverse wire mask blanks 100 may be reused as often as desired.

A suitable connector receiving element mask blank 110 is shown in FIG. 10. Connector receiving element mask blanks 110 may be in any suitable form. In the preferred embodiment shown, the blank is a hollow elliptical-shape with an aperture 112 on one end. The shape of the mask blank 110 should correspond to the shape of the connector receiving element 16 that the mask blank 110 will cover. A designated connector receiving element 16 is inserted into the aperture 112 such that the mask blank 110 protects the connector receiving element 16 from powder-coating, painting, or other treatment, maintaining the electrical conductivity of the connector receiving element 16. Thereafter, the connector receiving element mask blank 110 is removed and may be reused as often as desired.

The above discussed wire mask blanks 100, 102, and 110, are understood to be examples and are not limitation on the type of mask blank that would be suitable for use.

In yet another aspect of the invention, as shown in FIG. 12, anti-friction rollers 120 are provided to facilitate and ease the drawing of cables, conduits, etc. over the cable tray system. These rollers 120, in the preferred embodiment, are in the form of cylindrical sections of plastic, having a slit 124 defined in their sidewalls to permit them to be easily slipped over transverse wires 14 or 18. Preferably, the inside diameter 122 of rollers 120 is close to but slightly larger than the outside diameter of transverse wires 14 and 18 so as to permit for the easy placement of rollers 120 onto the transverse wires and permit the rollers to rotate in place as the conduit, wire, etc. is drawn thereover. Their use on a cable tray 10 can be seen in FIG. 8.

As shown in FIGS. 34-36, the end transverse wires 18 of one cable tray 10 form a square projection when they lie in registry with the connector receiving element 16 of an adjacent cable tray. A carriage bolt 22, having a hexagonal or other polygonal-shaped integrally formed bolt head 23, can be passed through this projection such that the bolt head 23 lies between end transverse wires 18 and is held therebetween against rotation. Nut 24 is engaged on bolt 22 and has a flange 25 which engages connector receiving element 16, thereby sandwiching connector receiving element 16 against end transverse wires 18 and bolt head 23. This arrangement allows an installer in the field to tighten nut 24 with one hand. A similar projection is formed regardless of whether the connector receiving element 16 is located on the sidewall or cable-bearing surface of the cable tray 10. FIG. 35 shows the way in which the end transverse wires 18, connector receiving element 16, and nut 24 may be associated with the carriage bolt 22. In the preferred embodiment, but not by way of limitation, the end transverse wires 18 are adjacent to the head of the carriage bolt 22, and the connector receiving element 16 is adjacent to the nut 24. However, any suitable arrangement for securing adjacent trays is contemplated by this invention.

What is claimed is:

1. A cable tray for use in a cable tray system in which at least two cable trays are connected together with at least one fastener, the cable tray comprising:

a cable support assembly having a weight-bearing base portion and a plurality of sidewalls, the sidewalls being connected to longitudinal edges of the base portion and extending in a common direction perpendicular to the base portion, the base portion defining a plurality of open ends of the cable support assembly;

a connector receiving member connected to the base portion of the cable support assembly proximate a first open end of the cable support assembly, the connector receiving member including two parallel sections separated by a space and extending transversely across at least part of a width of the base portion, the two parallel sections of the connector receiving member being arranged to at least receive at least a portion of a first fastener in the space therebetween; and a connector receiving element connected to the base portion of the cable support assembly proximate a second open end of the cable support assembly, the connector receiving element including two parallel sections separated by a space and extending longitudinally beyond the second open end of the cable support assembly, the two parallel sections of the connector receiving element being arranged to at least receive at least a portion of a second fastener therebetween, the connector receiving element further including a loop member interconnecting common ends of the two parallel sections of the connector receiving element, such that the connector receiving element forms a looping element that extends beyond the second open end of the cable support assembly.

2. A cable tray for use in a cable tray system in which at least two cable trays are connected together with at least one fastener, the cable tray comprising:

a cable support assembly having a weight-bearing base portion and a plurality of sidewalls, the sidewalls being connected to longitudinal edges of the base portion and extending in a common direction perpendicular to the base portion, the base portion defining a plurality of open ends of the cable support assembly;

a connector receiving member connected to the base portion of the cable support assembly proximate a first open end of the cable support assembly, the connector receiving member including two parallel sections separated by a space and extending transversely across at least part of a width of the base portion, the two parallel sections of the connector receiving member being arranged to at least receive at least a portion of a first fastener in the space therebetween;

a connector receiving element connected to the base portion of the cable support assembly proximate a second open end of the cable support assembly, the connector receiving element including two parallel sections separated by a space and extending longitudinally beyond the second open end of the cable support assembly, the two parallel sections of the connector receiving element being arranged to at least receive at least a portion of a second fastener therebetween; and a second connector receiving element connected to the base portion of the cable support assembly proximate the first open end of the cable support assembly, the second connector receiving element including two parallel sections separated by a space and extending longitudinally beyond the first open end of the cable support assembly, the two parallel sections of the second connector receiving element being arranged to at least receive at least a portion of a third fastener therebetween.

3. The cable tray of claim 2, wherein the second connector receiving element is positioned directly across from the connector receiving member along the width of the base portion of the cable support assembly and is further positioned diagonally across from the connector receiving element along a length of the base portion of the cable support assembly.

4. A cable tray system comprising:

a first cable tray including a first cable support assembly and a connector receiving member, the first cable support assembly having a weight-bearing base portion and a plurality of sidewalls, the sidewalls of the first cable support assembly being connected to longitudinal edges of the base portion of the first cable support assembly and extending in a common direction perpendicular to the base portion of the first cable support assembly, the base portion of the first cable support assembly defining a plurality of open ends of the first cable support assembly, the connector receiving member being connected to at least one of the base portion and a sidewall of the first cable support assembly proximate an open end of the first cable support assembly, the connector receiving member including two parallel wire sections separated by a space and extending transversely across at least part of a width of the base portion or the sidewall of the first cable support assembly;

a second cable tray including a second cable support assembly mid a connector receiving element, the second cable support assembly having a weight-bearing base portion and a plurality of sidewalls, the sidewalls of the second cable support assembly being connected to longitudinal edges of the base portion of the second cable support assembly and extending in a common direction perpendicular to the base portion of the second cable support assembly, the base portion of the second cable support assembly defining a plurality of open ends of the second cable support assembly, the connector receiving element being connected to at least one of the base portion and a sidewall of the second cable support assembly, proximate an open end of the second cable support assembly, the connector receiving element including two parallel wire sections separated by a space and extending longitudinally beyond the open end of the second cable support assembly, wherein the space between the two parallel wire sections of the connector receiving element of the second cable tray overlaps the space between the two parallel wire sections of the connector receiving member of the first cable tray when the second cable tray is positioned adjacent the first cable tray; and a fastener adapted to pass trough the connector receiving member of the first cable tray and the connector receiving element of the second cable tray to secure the two parallel wire sections of the connector receiving element to the two parallel wire sections of the connector receiving member.

5. The cable tray system of claim 4, wherein at least one of the first cable support assembly and the second cable support assembly is pre-formed into a shape having at least one interior angle, wherein said shape allows for intersection of a plurality of cable trays at angles other than 180 degrees.

6. The cable tray system of claim 4, wherein at least one of the two parallel wire sections of the connector receiving member includes an insulated portion and an electrically conductive portion, wherein at least one of the two parallel wire sections of the connector receiving member includes an insulated portion and an electrically conductive portion, and wherein the electrically conductive portion of the two parallel wire sections of the connector receiving member engages The electrically conductive portion of the two parallel wire sections of the connector receiving element when the connector receiving member is secured to the connector receiving element by the fastener, thereby providing electrical continuity between the first cable tray and the second cable tray.

7. The cable tray system of claim 6, wherein the electrically conductive portion of the two parallel wire sections of the connector receiving member and the electrically conductive portion of the two parallel wire sections of the connector receiving element include a conductive, noncorrosive coating, and wherein the insulated portion of the two parallel wire sections of the connector receiving member and the insulated portion of the two parallel wire sections of the connector receiving element include an electrically non-conductive coating.

8. The cable tray system of claim 4, wherein the fastener comprises a carriage bolt and a nut and wherein the two parallel wire sections of the connector receiving member are separated so as to receive and snugly engage a head of the carriage bolt such that rotation of the carriage bolt is prevented during threading of the nut onto the carriage bolt.

9. The cable tray system of claim 4, wherein the fastener comprises a carriage bolt and a nut and wherein the two parallel wire sections of the connector receiving element are separated so as to receive and snugly engage a head of the carriage bolt such that rotation of the carriage bolt is prevented during threading of the nut onto the carriage bolt.

10. The cable tray system of claim 4, wherein the fastener is electrically conductive.

11. A cable tray for use in a cable tray system in which at least two cable trays are connected together with at least one fastener, the cable tray comprising:
    a cable support assembly having a weight-bearing base portion and a plurality of sidewalls, the sidewalls being connected to longitudinal edges of the base portion and extending in a common direction perpendicular to the base portion, the base portion defining a plurality of open ends of the cable support assembly; and
    a connector receiving member integrated into a sidewall of the cable support assembly proximate an open end of the cable support assembly, the connector receiving member including two parallel sections separated by a space and extending transversely across at least part of a width of the sidewall, the two parallel sections of the connector receiving member being arranged to at least receive at least a portion of a fastener in the space therebetween, wherein at least one of the two parallel sections of the connector receiving member includes an insulated portion and an electrically conductive portion, and wherein the electrically conductive portion is arranged to engage the portion of the fastener.

12. The cable tray system of claim 4, wherein the connector receiving member of the first cable tray is integrated into the base portion or the sidewall of the first cable support assembly.

13. A cable tray system comprising:
    a first cable tray including a first cable support assembly and a connector receiving member, the first cable support assembly having a weight-bearing base portion and a plurality of sidewalls, the sidewalls of the first cable support assembly being connected to longitudinal edges of the base portion of the first cable support assembly and extending in a common direction perpendicular to the base portion of the first cable support assembly, the base portion of the first cable support assembly defining a plurality of open ends of the first cable support assembly, the connector receiving member being connected to at least one of the base portion and a sidewall of the first cable support assembly proximate an open end of the first cable support assembly, the connector receiving member including an insulated portion and an electrically conductive, contact portion, wherein the electrically conductive, contact portion of the connector receiving member defines an open space therein;
    a second cable tray including a second cable support assembly and a connector receiving element, the second cable support assembly having a weight-bearing base portion and a plurality of sidewalls, the sidewalls of the second cable support assembly being connected to longitudinal edges of the base portion of the second cable support assembly and extending in a common direction perpendicular to the base portion of the second cable support assembly, the base portion of the second cable support assembly defining a plurality of open ends of the second cable support assembly, the connector receiving element being connected to at least one of the base portion and a sidewall of the second cable support assembly proximate an open end of the second cable support assembly, the connector receiving element including an insulated portion and an electrically conductive, contact portion, the electrically conductive, contact portion of the connector receiving element defining an open space therein, wherein the electrically conductive, contact portion of the connector receiving element of the second cable tray overlaps the electrically conductive, contact portion of the connector receiving member of the first cable tray when the first cable tray and the second cable tray are positioned adjacent one another; and
    a fastener adapted to pass through the open space defined by the connector receiving member of the first cable tray and the open space defined by the connector receiving element of the second cable tray to secure the electrically conductive, contact portion of the connector receiving member of the first cable tray to the electrically conductive, contact portion of the connector receiving element of the second cable tray, thereby providing electrical continuity between the first cable tray and the second cable tray.

14. The cable tray system of claim 13, wherein the insulated portion of the connector receiving member of the first cable tray comprises a non-conductive covering disposed upon a first conductive material and is substantially larger than the electrically conductive, contact portion of the connector receiving member, wherein the insulated portion of the connector receiving element of the second cable tray comprises a non-conductive covering disposed upon a second conductive material and is substantially larger than the electrically conductive, contact portion of the connector receiving element, and wherein the insulated portions of the connector receiving member and the connector receiving element isolate the first conductive material and the second, conductive material from cables passed through the first cable tray and the second cable tray.

15. The cable tray of claim 11, wherein the two parallel sections of the connector receiving member are configured to at least receive a portion of the fastener in the space separating the two parallel sections when the fastener is positioned perpendicular to the sidewall.

16. A cable tray for use in a cable tray system in which at least two cable trays are connected together with at least one fastener, the cable tray comprising:

a cable support assembly having a weight-bearing base portion and a plurality of sidewalls, the sidewalls being connected to longitudinal edges of the base portion and extending in a common direction perpendicular to the base portion, the base portion defining a plurality of open ends of the cable support assembly; and a connector receiving member connected to the base portion of the cable support assembly proximate a first open end of the cable support assembly, the connector receiving member including two parallel sections separated by a space and extending transversely across at least part of a width of the base portion, the two parallel sections of the connector receiving member being configured to at least receive at least a portion of a first fastener of the at least one fastener in the space therebetween;

wherein at least one of the two parallel sections of the connector receiving member includes an insulated portion and an electrically conductive portion, and wherein the electrically conductive portion is designed and configured to engage the portion of the first fastener when the first fastener is positioned in the space between the two parallel sections.

17. The cable tray of claim 16, wherein the two parallel sections of the connector receiving member are horizontally separated and receive at least a portion of the first fastener in the space therebetween.

18. The cable tray of claim 16, wherein the first fastener includes a carriage bolt, and wherein the two parallel sections of the connector receiving member are separated and configured so as to receive and snugly engage a head of the carriage bolt such that rotation of the carriage bolt is prevented during threading of a nut onto the carriage bolt.

19. The cable tray of claim 16, further comprising:
a connector receiving element connected to the base portion of the cable support assembly proximate a second open end of the cable support assembly, the connector receiving element including two parallel sections separated by a space and extending longitudinally beyond the second open end of the cable support assembly, the two parallel sections of the connector receiving element being configured to at least receive at least a portion of a second fastener of the at least one fastener in the space between the two parallel sections of the connector receiving element.

20. The cable tray of claim 19, wherein the two parallel sections of the connector receiving element are horizontally separated and configured so as to receive at least a portion of the second fastener in the space between the two parallel sections of the connector receiving element.

21. The cable tray of claim 19, wherein the connector receiving element is positioned directly across from the connector receiving member along a length of the base portion of the cable support assembly.

22. The cable tray of claim 19, wherein the connector receiving element includes at least one J-shaped hook.

23. The cable tray of claim 16, further comprising:
a connector receiving element connected to a sidewall of the cable support assembly proximate one of the first open end and a second open end of the cable support assembly, the connector receiving element including two parallel sections separated by a space and extending longitudinally beyond the first open end or the second open end of the cable support assembly, the two parallel sections of the connector receiving element designed and configured to at least receive at least a portion of a second fastener of the at least one fastener in the space between the two parallel sections of the connector receiving element.

24. A cable tray for use in a cable tray system in which at least two cable trays are connected together with at least one fastener, the cable tray comprising:

a cable support assembly having a weight-bearing base portion and a plurality of sidewalls, the sidewalls being connected to longitudinal edges of the base portion and extending in a common direction perpendicular to the base portion, the base portion defining a plurality of open ends of the cable support assembly;

a connector receiving member connected to the base portion of the cable support assembly proximate a first open end of the cable support assembly, the connector receiving member including two parallel sections separated by a space and extending transversely across at least part of a width of the base portion, the two parallel sections of the connector receiving member being configured to at least receive at least a portion of a first fastener of the at least one fastener in the space therebetween; and a connector receiving element connected to the base portion of the cable support assembly proximate a second open end of the cable support assembly, the connector receiving element including two parallel sections separated by a space and extending longitudinally beyond the second open end of the cable support assembly, the two parallel sections of the connector receiving element being configured to at least receive at least a portion of a second fastener of the at least one fastener in the space between the two parallel sections of the connector receiving element;

wherein at least one of the two parallel sections of the connector receiving element includes an insulated portion and an electrically conductive portion, and wherein the electrically conductive portion is designed and configured to engage the portion of the second fastener.

25. The cable tray of claim 24, wherein at least one of the two parallel sections of the connector receiving member includes a second insulated portion and a second electrically conductive portion, and wherein the second electrically conductive portion is designed and configured to engage the portion of the first fastener.

26. The cable tray of claim 16, wherein the two parallel sections of the connector receiving member are configured to at least receive a portion of the fastener in the space separating the two parallel sections when the fastener is positioned perpendicular to the base portion.

* * * * *